(12) United States Patent
Nuspl et al.

(10) Patent No.: US 9,242,864 B2
(45) Date of Patent: Jan. 26, 2016

(54) CYCLIC PROCESS FOR WET-CHEMICALLY PRODUCING LITHIUM METAL PHOSPHATES

(75) Inventors: Gerhard Nuspl, Forstern (DE); Christian Vogler, Moosburg (DE); Josefine Zuber, Landshut (DE)

(73) Assignee: JOHNSON MATTHEY PLC, London (GB)

( * ) Notice: Subject to any disclaimer, the term of this patent is extended or adjusted under 35 U.S.C. 154(b) by 1513 days.

(21) Appl. No.: 11/908,832

(22) PCT Filed: Mar. 17, 2006

(86) PCT No.: PCT/EP2006/002472
§ 371 (c)(1),
(2), (4) Date: Nov. 13, 2008

(87) PCT Pub. No.: WO2006/097324
PCT Pub. Date: Sep. 21, 2006

(65) Prior Publication Data
US 2009/0117022 A1    May 7, 2009

(30) Foreign Application Priority Data
Mar. 18, 2005    (DE) .................. 10 2005 012 640

(51) Int. Cl.
| C01B 25/30 | (2006.01) |
| C01B 25/45 | (2006.01) |
| C01B 25/37 | (2006.01) |

(52) U.S. Cl.
CPC .............. *C01B 25/45* (2013.01); *C01B 25/37* (2013.01)

(58) Field of Classification Search
CPC ...... C01B 25/37; C01B 25/375; C01B 25/45; Y02E 60/122

USPC ........................................................ 423/306
See application file for complete search history.

(56) References Cited

U.S. PATENT DOCUMENTS 4,065,510 A * 12/1977 Schreyer et al. .............. 568/908
6,794,084 B2 * 9/2004 Adamson et al. .......... 429/218.1
(Continued)

FOREIGN PATENT DOCUMENTS

| DE | 10353266 A1 | 6/2005 |
| WO | WO 02083555 A2 | 10/2002 |
| WO | WO 2005076390 A2 | 8/2005 |

OTHER PUBLICATIONS

Franger et al., "Comparison between different LiFePO4 synthesis routes and their influence on its physico-chemical properties," 2003, Journal of Power Sources, 119-121, pp. 252-257.*

(Continued)

*Primary Examiner* — Jun Li
(74) *Attorney, Agent, or Firm* — Millen, White, Zelano & Branigan, P.C.

(57) ABSTRACT

The invention relates to a method for producing lithium metal phosphates of a formula $LiMPO_4$, wherein M is at least one type of bivalent metal, preferably selected from the first transition metal range. The inventive method consists in reacting a lithium phosphate with a metal salt and an acid phosphate source in a polar solvent for converting into a corresponding M-containing phosphate, in adding a basic lithium source for obtaining a precursor mixture for a desired lithium metal phosphate, in converting and separating the thus obtained mixture, preferably in hydrothermal conditions, in such a way that a desired final product is obtained, thereby receiving a lithium-containing filtrate. The addition of the basic lithium source initiates a lithium ion precipitation in the form of a lithium phosphate. The thus obtainable lithium phosphate can be reused in the form of a raw material, whereby said cycle enables lithium to be highly reusable.

27 Claims, 5 Drawing Sheets

(56) References Cited

U.S. PATENT DOCUMENTS

| | | |
|---|---|---|
| 6,913,855 B2 * | 7/2005 | Stoker et al. ............ 429/231.95 |
| 2003/0124423 A1 | 7/2003 | Sasaki et al. |
| 2004/0151649 A1 | 8/2004 | Hemmer et al. |
| 2007/0152185 A1 | 7/2007 | Gauthier et al. |

OTHER PUBLICATIONS

Delacourt et al, "Crystal chemistry of the olivine-type LixFePO4 system (0=<x=<1) between 25 and 370@?<o>C", Solid State Sciences, Elsevier, Paris, FR, vol. 7 No. 12, Dec. 2005, pp. 1506-1516, XP005192270.

Delacourt et al, "Electrochemical and electrical properties of Nb- and/ or C-containing LifePO4 composites", Solid State Ionics, North Holland Pub. Company, Amsterdam, NL, vol. 177 No. 3-4, Jan. 31, 2006, pp. 333-341, XP005272065.

Meligrana et al, "Hydrothermal synthesis of high surface LifePO4 powders as cathode for Li-ion cells", Journal of Power Sources, Elsevier, Amsterdam, NL, vol. 160 No. 1, Sep. 29, 2006, pp. 516-522, XP005649261.

Arnold G et al, "Fine-particle lithium iron phosphate LifePO4 synthesized by a new low-cost aqueous precipitation technique", Journal of Power Sources, Elsevier, Amsterdam, NL, vol. 119-121, Jun. 1, 2003, pp. 247-251, XP004430175.

Tajimi S et al, "Enhanced electrochemical performance of LifePO4 prepared by hydrothermal reaction", Solid State Ionics, North Holland Pub. Company, Amsterdam, NL, vol. 175 No. 1-4, Nov. 30, 2004, pp. 287-290, XP004667584.

Yang S et al, "Hydrothermal synthesis of lithium iron phosphate cathodes", Electrochemistry Communication, Elsevier, Amsterdam, NL, vol. 3, 2001, pp. 505-508, XP002266496.

Morgan D et al, "Li Conductivity in LixMPO4 (M=Mn,Fe,Co,Ni) Olivine Materials", Electrochemical and Solid-State Letters, IEEE Service Center, Piscataway, NJ, US, vol. 7 No. 2, 2004, pp. A30-A32, XP009056734.

* cited by examiner

CYCLIC PROCESS FOR WET-CHEMICALLY PRODUCING LITHIUM METAL PHOSPHATES

The invention relates to a process for preparing lithium metal phosphates of the formula $LiMPO_4$, where M is at least one divalent metal, in particular of the first transition series.

Synthetic lithium iron phosphate ($LiFePO_4$) is used as cathode material in lithium ion batteries. Thus, U.S. Pat. No. 5,910,382 describes a cathode material for a rechargeable battery, wherein the cathode comprises a compound of the formula $LiMPO_4$ in which M is at least one cation from the first transition series.

WO02/099913 describes a process for preparing $LiMPO_4$, in which the water is evaporated from an equimolar aqueous solution of $Li^+$, $Fe^{3+}$ and $PO_4^{3-}$ and a solid mixture is produced as a result. The solid mixture is subsequently decomposed at a temperature of less than 500° C. to produce a pure Li and Fe phosphate precursor. Reaction of the precursor at a temperature of less than 800° C. in a reducing atmosphere gives $LiFePO_4$.

EP 1 195 838 A2 describes the structure of a nonaqueous electrolysis cell in which lithium transition metal phosphates $LiMPO_4$, especially $LiFePO_4$, are, inter alia, used as cathode material. This is synthesized in a solid-state process. Here, dry and solid lithium phosphate and iron(II) phosphate octahydrate are mixed, milled and reacted by heat treatment and sintering at about 600° C. for a number of hours. The milling techniques used result not only in a complicated and costly process but also in the risk of contamination of the product $LiFePO_4$ by residues and abrasion of the mill.

WO02/08355 describes binary, ternary and quaternary lithium metal phosphates of the general formula $Li(Fe_xM1_yM2_z)PO_4$, where M1 is at least one element from the group consisting of Sc, Ti, V, Cr, Mn, Co, Ni, Cu, Zn, Be, Mg, Ca, Sr, Ba, Al, Zr and La, M2 is at least one element from the group consisting of Sc, Ti, V, Cr, Mn, Co, Ni, Cu, Zn, Be, Mg, Ca, Sr, Ba, Al, Zr and La and $0.5 \leq x < 1$, $0 < y < 0.5$ and $0 < z < 0.5$, with the proviso that $x+y+z=1$ or $x=0$, $y=1$, $z=0$. The lithium metal phosphate can be obtained by a process in which precursor compounds of the elements Li, Fe, M1 and/or M2 are precipitated from aqueous solutions and the precipitation product is then firstly dried at a temperature in the range from room temperature to about 200° C. and subsequently calcined at a temperature in the range from 300° C. to 1000° C. under an inert gas atmosphere or a reducing atmosphere.

Journal of Power Sources 119-121 (2003) 247-251 describes a wet-chemical process for preparing $LiFePO_4$. Here, the starting materials $Fe_3(PO_4)_2$ and $Li_3PO_4$ are mixed as aqueous solutions and coprecipitated as a function of the pH. The filtered intermediate is subsequently reacted at from 650° C. to 800° C. under inert gas for 12 hours to give the lithium iron phosphate $LiFePO_4$. The process results in relatively high residual lithium concentrations in the filtrate.

JP 2002-151082 A describes a process for preparing lithium iron phosphate, in which a lithium compound, a divalent iron compound and a phosphoric acid compound are mixed in such amounts that the molar ratio of the divalent iron ions and the phosphoric acid ions is about 1:1. The mixture is reacted in a temperature range from at least 100° C. to not more than 200° C. in a tightly closed vessel with addition of a polar solvent and an inactive gas. The lithium iron phosphate obtained in this way can subsequently be physically comminuted.

In the processes known from the prior art for preparing lithium iron phosphate, relatively high materials costs have to be accepted for the starting chemicals, e.g. iron oxalate. In addition, the consumption of protective gas during the sintering process is considerable and toxic by-products such as CO can be formed during sintering. It has also been found that the particle size distribution of the product is frequently very broad and bimodal and the lithium iron phosphate has a relatively large particle size and a broad particle size distribution.

DE 103 53 266 describes a process for preparing a compound of the formula $LiMPO_4$, where M is at least one metal of the first transition series. In a first step, a precursor mixture comprising at least one $Li^+$ source, at least one $M^{2+}$ source and at least one $PO_4^{3-}$ source is prepared in order to precipitate a precipitate and thus produce a precursor suspension. The precursor mixture or the precursor suspension is subjected to a dispersing or milling treatment. This treatment is carried out until the $D_{90}$ of the particles in the precursor suspension is less than 50 μm. The $LiMPO_4$ is prepared from the resulting precursor suspension, preferably by reaction under hydrothermal conditions. The material obtained has a particularly advantageous narrow particle size distribution and very good electrochemical properties when used in electrodes.

Lithium metal phosphates of the formula $LiMPO_4$ used as electrode material in secondary lithium batteries have to meet high standards of chemical purity in order to achieve high performance of the secondary battery. For example, no further alkali metal ions apart from lithium may be present in the material. In a process of the type described in DE 103 53 266, only a pure lithium compound, in particular lithium hydroxide, can therefore be used as precipitate. However, it is inherent in the process that only a third of the lithium ions used are utilized for the preparation of the desired end product while the remaining two thirds of the lithium ions used serve only as precipitate and go into the wastewater. The circumstances lead to problems in wastewater disposal and economic disadvantages because lithium is the most expensive raw material component in the preparation of lithium iron phosphate.

To be able to utilize the lithium ions present in the wastewater again, attempts have been made to precipitate them as carbonate. Lithium carbonate is then obtained as coproduct during the preparation of the lithium metal phosphate and can be used for further purposes. U.S. Pat. No. 3,857,920 describes a process for separating lithium ions from wastewater, in which lithium is precipitated in the form of a carbonate. However, lithium carbonate can only be used for the synthesis of lithium metal phosphates after conversion into a salt which is very readily soluble in water. This requires further production steps, which is unfavourable from the point of view of costs. In addition, lithium carbonate has a comparatively high residual solubility, so that a large part of the lithium ions is lost in the wastewater. Although lithium compounds having a lower residual solubility would increase the yield of lithium recovered from the wastewater, their further utility is restricted even further.

It was an object of the invention to provide a process for preparing lithium metal phosphates of the formula $LiMPO_4$, where M is at least one divalent metal, in particular of the first transition series, with the process being designed in such a way that the lithium-containing material used is converted very completely into the desired end product and, in the ideal case, no lithium is lost via the wastewater.

This object is achieved by a process according to claim 1. Advantageous embodiments of the process of the invention are subject matter of the dependent claims.

The invention provides a process for preparing lithium metal phosphates of the formula $LiMPO_4$, where M is at least one divalent metal, preferably of the first transition series. The process of the invention comprises the following steps:

a) reaction of a lithium phosphate with a metal salt $MX_n$ and an acid phosphate source, preferably phosphoric acid, in a polar solvent, where X is an anion which together with the metal M forms a salt which is soluble in the solvent and n is the quotient of the valency of the metal M and the valency of the anion X, giving a suspension of at least one M-containing phosphate in the solvent;

b) addition of a basic lithium source such as lithium hydroxide or lithium oxide to the suspension of metal phosphate in the solvent obtained in step (a), giving a precipitation product;

c) conversion of the precipitation product obtained in (b) into a lithium metal phosphate of the formula $LiMPO_4$, giving a residual solution containing lithium ions;

d) addition of a basic phosphate source, preferably an alkali metal phosphate, to the residual solution so that lithium phosphate, preferably lithium orthophosphate, is precipitated from the residual solution;

e) separation of the lithium phosphate from the suspension.

Lithium phosphate, in particular lithium orthophosphate, is a lithium compound which is very sparingly soluble in water and other polar solvents. However, it can be brought back into solution as lithium dihydrogenphosphate by addition of phosphoric acid. If this dissolution process is integrated into the synthesis of the lithium metal phosphate, only about half of the lithium phosphate obtained in the recovery step can be recirculated to the synthesis while the second half of the lithium phosphate is obtained as coproduct and has to be passed to a further use. However, the demand for lithium phosphate is only very low. Lithium orthophosphate is used, for example, as a basic catalyst for particular organic syntheses. For all of the lithium phosphate obtained in the synthesis of the lithium metal phosphate to be able to be recirculated to the synthesis process, the lithium phosphate would have to be dissolved as dilithium hydrogenphosphate by means of a reduced amount of phosphoric acid. However, no efficient processes have been developed for this purpose.

It has now surprisingly been found that in the presence of metal salts and phosphoric acid it is possible to dissolve solid lithium phosphate, in particular lithium orthophosphate, completely and at the same time reprecipitate it as M-containing phosphate. Thus, a recrystallization which is favoured by the low solubility of the M-containing phosphate takes place. If this step of a reprecipitation of lithium phosphate to form a lithium metal phosphate is integrated into the preparation of the lithium metal phosphate, it is possible for all the lithium required as precipitate for the preparation of the lithium metal phosphate to be recirculated to the production process by precipitating the lithium as lithium phosphate, in particular as lithium orthophosphate, in a final step.

In a first step (a), lithium phosphate, in particular lithium orthophosphate, is dissolved together with at least one metal salt $MX_n$ and an acid phosphate source, in particular phosphoric acid, in a polar solvent. This results in formation of at least one phosphate salt of the metal ion used and lithium dihydrogenphosphate which is soluble in the solvent. Furthermore, a lithium salt $Li_mX$, where m is the valency of the anion X, which is formed from the anion of the metal salt used is present in the solution, As acid phosphate source, it is possible to use compounds which give a pH of less than 7 in water and comprise either a phosphate anion or can be converted into a phosphate anion.

As polar solvent, it is possible to use solvents which are miscible with water and preferably have a polarity higher than that of acetone.

Lithium phosphate, metal salt $MX_n$ and acid phosphate source are preferably used in such amounts that they correspond approximately to the stoichiometric ratios of the following reaction equation, in which phosphoric acid is used by way of example as acid phosphate source:

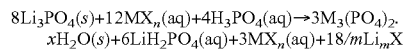

$$8Li_3PO_4(s)+12MX_n(aq)+4H_3PO_4(aq) \rightarrow 3M_3(PO_4)_2 \cdot xH_2O(s)+6LiH_2PO_4(aq)+3MX_n(aq)+18/mLi_mX$$

In the subsequent step (b), a basic lithium source such as lithium hydroxide or lithium oxide is added in dissolved or solid form to increase the pH and precipitate the remaining metal salt $MX_n$, which is still present in the solution, as M-containing phosphate. During this step, $Li_mX$ remains in solution while lithium phosphate compounds precipitate completely or partly depending on stoichiometric ratios and reaction conditions and form a precipitation product with the M-containing phosphate. The amount of basic lithium source, preferably lithium hydroxide, added corresponds in the ideal case to the amount of lithium which is later present in the lithium metal phosphate to be prepared.

For the purposes of the present invention, a basic lithium compound is a compound which gives a pH of more than 7 in water.

The basic lithium source, preferably the lithium hydroxide, is preferably added in such an amount that the following reaction equation applies:

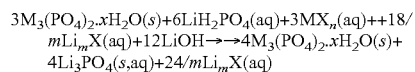

$$3M_3(PO_4)_2 \cdot xH_2O(s)+6LiH_2PO_4(aq)+3MX_n(aq)++18/mLi_mX(aq)+12LiOH \rightarrow \rightarrow 4M_3(PO_4)_2 \cdot xH_2O(s)+4Li_3PO_4(s,aq)+24/mLi_mX(aq)$$

However, deviations from the abovementioned stoichiometric ratios may also be desired, for example in order to achieve a specific composition of the precipitation product itself, preferably a composition which corresponds to the molar ratios of the lithium metal phosphate desired as end product.

The precipitation product obtained in step (b), which consists essentially of the M-containing phosphate and possibly lithium phosphate, is converted into the desired lithium metal phosphate $LiMPO_4$ in a further reaction step.

For this purpose, the suspension obtained in step (b) is preferably converted directly under hydrothermal conditions in step (c) into the desired lithium metal phosphate of the formula $LiMPO_4$.

The hydrothermal synthesis proceeds according to the following idealized net equation:

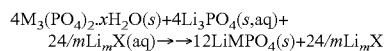

$$4M_3(PO_4)_2 \cdot xH_2O(s)+4Li_3PO_4(s,aq)+24/mLi_mX(aq) \rightarrow \rightarrow 12LiMPO_4(s)+24/mLi_mX$$

The lithium metal phosphate of the formula $LiMPO_4$ is then separated off from the suspension and processed further in the customary way, for example by washing and drying it. The lithium metal phosphate can be separated off by customary methods, for example by filtration (e.g. in a pressure filter), centrifugation, sedimentation or decantation of the supernatant solution.

The suspension of the precipitation product obtained in step (b) does not necessarily have to be converted directly into the lithium metal phosphate in step (c). It is also possible, for example, to separate off the precipitation product from the suspension, to wash it if necessary and to dry it and only then to convert it into the lithium metal phosphate by means of a heat treatment under inert or reducing conditions. In the heat treatment, the precipitation product can be calcined, with the calcination being able to be carried out at temperatures of more than 400° C., preferably more than 600° C. The precipitation product can likewise be separated off from the suspension obtained in step (b) by, for example, filtration, centrifugation or decantation.

However, the direct hydrothermal reaction is preferred since it comprises fewer intermediate steps.

The separation of the precipitation product obtained in step (b) from the suspension or the separation of the lithium metal phosphate obtained by hydrothermal reaction from the suspension leads, in step (c), to formation of a residual solution containing lithium ions.

A basic phosphate source, preferably an alkali metal phosphate $A_3PO_4$, is then added to this residual solution in step (d) so that the lithium dissolved in the filtrate is precipitated in the form of lithium phosphate, preferably as lithium orthophosphate. In the alkali metal phosphate $A_3PO_4$, A is an alkali metal, preferably potassium or sodium, particularly preferably sodium. As basic phosphate source, it is possible to use a compound which provides phosphate ions and gives a pH of more than 7 in water.

The precipitation of the lithium phosphate occurs according to the following idealized equation:

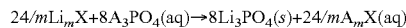

$$24/m\,Li_mX + 8A_3PO_4(aq) \rightarrow 8Li_3PO_4(s) + 24/m\,A_mX(aq)$$

Finally, in step (e), the lithium phosphate is separated off from the suspension and, if appropriate, washed and dried. The filtrate obtained is worked up further or passed to proper disposal.

Thus, in the ideal case, only the equivalent amounts of metal and lithium and also phosphate ions necessary for the preparation of the lithium metal phosphate are added in the process of the invention. Under ideal reaction conditions, no lithium ions and no ions of the metal M are present in the wastewater obtained after the lithium phosphate has been separated off in the final step. To keep contamination of the wastewater with the ions mentioned as low as possible, preference is therefore given to working as close as possible to the ratios defined by the abovementioned reaction equations. However, it may also be advantageous to deviate deliberately from the stoichiometric ratios mentioned, for example in order to control the morphology of the precipitation product or to increase the yield of recovered lithium, for example by means of an excess of phosphate ions or alkalizing agent.

As mentioned above, the lithium phosphate which is recovered in step (e) is preferably recirculated to step (a). At the beginning of production, it is therefore necessary to use an appropriate amount of lithium phosphate only once, and this is then circulated in its entirety in the ideal case.

The process of the invention is suitable per se for preparing compounds of the general empirical formula $LiMPO_4$, where M comprises one or more divalent metal ions. M is preferably one or more divalent transition metals, in particular Fe, Mn, Ni, Co. Very particular preference is given to M comprising at least Fe. A proportion of up to 10 mol % of the metal ions M can also be replaced by metal ions which are not divalent, which can lead, in a manner well-known in structural chemistry, to structural defects and nonstoichiometric compounds. Li and phosphate can also be replaced to a small extent by other ions in the respective sites in the structure. Such deviations from the ideal formula $LiMPO_4$ are generally not desirable, but may not be able to be prevented from a production point of view. However, in some cases they can also be desirable and be brought about deliberately if they have an advantageous effect on the materials' properties.

Most divalent metal ions and the preferred divalent transition metal ions form readily water-soluble salts, e.g. as sulphates, chlorides or nitrates, and sparingly soluble phosphates. A person skilled in the art can therefore readily adapt the process of the invention for preparing lithium metal phosphates for the various metal ions mentioned. Lithium metal phosphates having a plurality of different metal ions M can be prepared in a simple fashion by making up mixed solutions of the various compounds $MX_n$ in step (a). Particular preference is given to using the process to prepare $LiFePO_4$.

The anion X of the metal salt $MX_n$ is selected so that the metal salt $MX_n$ can be dissolved in the polar solvent in which the reaction is carried out and the anion X forms a soluble compound with lithium. X is preferably selected from the group consisting of chloride, nitrate and sulphate, with the sulphate anion being particularly preferred.

In a preferred embodiment, an acid phosphate source, e.g. phosphoric acid, is used and is added to the solution of the metal salts $MX_n$ to bring them to a pH of preferably less than 2, particularly preferably less than 1, even before commencement of step (a). Under these conditions, the divalent ions of the metals M are stable to oxidation, so that the metal phosphate is obtained in pure form. Only in step (a) does the pH rise to a value in the range from 2 to 6 as a result of reaction with lithium phosphate. Step (a) and the subsequent steps are therefore preferably carried out with exclusion of oxygen in order to avoid oxidation.

In step (b), the pH of the suspension is increased further by addition of a basic lithium component, e.g. lithium hydroxide, preferably to a pH of from 6 to 8. To avoid oxidation of the metal M, a reducing agent is added to the suspension in step (a) in a particularly preferred embodiment. A suitable reducing agent is, for example, lithium sulphide, sulphurous acid, sulphites, dithionites, phosphites, hypophosphites, citric acid or citrates and the like.

In step (d) of the process of the invention, dissolved lithium ions are precipitated in the form of lithium phosphate from the residual solution obtained after the precipitation product or the lithium metal phosphate has been separated off. A suitable basic phosphate source is added for this purpose. The phosphate source added is advantageously an alkali metal phosphate, in particular sodium phosphate. However, it is also possible, for example, to use phosphoric acid and an alkalizing agent such as sodium hydroxide or sodium carbonate in combination. This is followed by replacement of the anions, preferably giving sparingly soluble lithium orthophosphate and the alkali metal salt of the anion X, which remains as a solution in water. In a particularly preferred embodiment, the precipitation conditions such as concentration, temperature, precipitation rate, mechanical energy input, etc., are set so that the precipitated lithium phosphate particles or agglomerates have a morphology which is particularly advantageous for the filtration and washing step, in particular a spherical particle or agglomerate shape. For this purpose, the residual solution containing lithium ions can also be, if appropriate, concentrated, for example by evaporation or reverse osmosis, or diluted with water or another solvent in order to bring the salt concentration into a range which is optimal for the precipitation. The separation of the precipitated lithium phosphate from the residual solution can, for example, be carried out by filtration (for example in a pressure filter, in a suction filter or in a chamber filter press), by centrifugation, sedimentation or decantation. The alkaline wastewater obtained after lithium phosphate has been separated off contains, when sodium phosphate has been used as phosphate source in step (d) and sulphate ions have been used as anions X of the metal salts $MX_n$, only sodium sulphate which, after neutralization, can be disposed of without great difficulty. It can also advantageously be used for neutralizing other acidic wastewater and thus be disposed of in a beneficial fashion.

The reaction in steps (a) and (b) is preferably carried out at temperatures in the range from about 5° to 80° C., more preferably from 15° to 60° C., particularly preferably from room temperature to 50° C., and preferably at atmospheric pressure. However, other reaction conditions can also be employed if they do not have an adverse effect on the precipitation.

In a preferred embodiment of the process of the invention, a dispersing or milling treatment of the suspension until the $D_{90}$ of the particles present in the suspension is less than 50 µm is carried out in steps (a), (b) and/or (c). As a result of the intensive dispersing or milling treatment, a very narrow particle size distribution and a very small particle size of the end product, $LiMPO_4$, can be achieved. The dispersing or milling treatment, in particular in steps (a) and/or (b), achieves firstly intensive mixing and secondly deagglomeration or comminution of the particle aggregates in the suspension. This is not achieved by stirring at a low speed.

The dispersing or milling treatment can be carried out in any apparatus which appears suitable to a person skilled in the art and generates sufficient shear forces or turbulence which lead to intensive mixing and simultaneously to deagglomeration or comminution of the particle aggregates in the suspension so that a $D_{90}$ of less than 50 µm is achieved. Preferred apparatuses include dispersers (with or without pump rotors), mills such as colloid mills or Manton-Gaulin mills, high-speed mixers, centrifugal pumps, in-line mixers, mixing nozzles such as injector nozzles, or ultrasonic instruments. These apparatuses are known per se to those skilled in the art. The settings necessary to obtain the desired effect on the mean particle size in the suspensions can be determined as a function of the type of apparatus by means of routine experiments.

The dispersing or milling treatment is preferably carried out in such a way that a power input into the suspension of at least 5 kW/m³, in particular at least 7 kW/m³, is achieved. This power input can be determined in a known manner as a function of the apparatus by means of the formula $P=2\cdot\pi\cdot n\cdot M$, where M is the torque and n is the speed of rotation.

In steps (a), (b) and/or (c), the dispersing or milling treatment of the suspension is preferably carried out until the $D_{90}$ of the particles present in the suspension is less than 25 µm, preferably less than 20 µm, particularly preferably less than 15 µm.

In steps (a) and (b), the dispersing or milling treatment is preferably commenced before the reprecipitation or precipitation of the particles commences and is continued to the end of the precipitation. The dispersing or milling treatment in step (a) therefore preferably commences before the addition of the metal salt $MX_n$ and continues until substantially complete conversion into the M-containing phosphate and the respective lithium salt has occurred. Correspondingly, the dispersing or milling treatment in step (b) preferably commences before addition of the basic lithium salt, preferably the lithium hydroxide, and is continued until complete conversion into the M-containing phosphate has occurred. In this way, the formation of large crystal platelets or crystal agglomerates is prevented or these are broken up. A homogeneous suspension of the precursor compounds is then present before the further conversion into the lithium metal phosphate. The precipitation product obtained in step (b) can firstly be isolated and then, for example, be converted into the finished lithium metal phosphate by calcination in an inert or reduced atmosphere. However, in a preferred embodiment, the conversion into the lithium metal phosphate is carried out directly under hydrothermal conditions and the steps (a), (b) and (c) are particularly preferably all carried out in the hydrothermal vessel (one-pot process).

The dispersing or milling treatment ensures that the precipitation proceeds very homogeneously and a homogeneous mixture of many small, approximately equal-sized crystal nuclei is formed. These crystal nuclei can be converted into very uniformly grown crystals of the end product $LiMPO_4$ having a very narrow particle size distribution in the subsequent process steps and preferably in a hydrothermal treatment.

As polar solvent, it is possible to use, for example, water, methanol, ethanol, 2-propanol, ethylene glycol, propylene glycol, acetone, cyclohexanone, 2-methylpyrrolidone, ethyl methyl ketone, 2-ethoxyethanol, propylene carbonate, ethylene carbonate, dimethyl carbonate, dimethylformamide or dimethyl sulphoxide or mixtures of these solvents. Water is preferred as solvent.

For the purposes of the present invention, a reaction of the mixture or suspension obtained in step (b) under hydrothermal conditions is regarded as any treatment at a temperature above room temperature and at a steam pressure above 1 bar. The hydrothermal treatment per se can be carried out in a known manner with which a person skilled in the art will be familiar. To set the hydrothermal conditions, temperatures of from 100 to 250° C., in particular from 100 to 180° C., and pressures of from 1 bar to 40 bar, in particular from 1 bar to 10 bar, of steam pressure are preferably used. The reaction is preferably carried out in a tightly closed or pressure-rated vessel. The reaction is preferably carried out under an inert or protective gas atmosphere. Suitable inert gases are, for example, nitrogen, argon, carbon dioxide, carbon monoxide or mixtures thereof, with nitrogen being preferred. The hydrothermal treatment can, for example, be carried out for from 0.5 to 15 hours, in particular for from 3 to 11 hours. Merely as a nonrestrictive example, the following specific conditions can be selected: 1.5 hours heating from 50° C. (temperature of the mixture obtained in step (b)) to 160° C., 10 hours hydrothermal treatment at 160° C., 3 hours cooling from 160° C. to 30° C.

The precipitation product prepared and separated off in the process of the invention or the hydrothermally obtained lithium metal phosphate $LiMPO_4$ can be dried and/or calcined within step (c). Careful drying/after-drying of the end product is generally also necessary for, inter alia, the electrochemical quality of the resulting lithium metal phosphate, since even slight traces of moisture can cause problems in electrochemical use of the material in secondary lithium batteries, e.g. decomposition of the electrolyte salt $LiPF_6$.

The drying/calcination of the isolated precipitation product or the hydrothermally obtained lithium metal phosphate $LiMPO_4$ in step (c) can be carried out over a wide temperature range from about 50 to 750° C., with the temperature also depending on economic considerations. If the preparation of $LiMPO_4$ is carried out in the absence of a carbon-containing or electron-conducting substance or a precursor thereof, drying at from about 50 to 350° C., for example for 3 hours at 250° C. under nitrogen 5.0, under reduced pressure or under shielding gas, will in most cases be sufficient. The drying conditions should be selected so that no oxidation of M(II) to M(III), in particular of Fe(II) to Fe(III), occurs, which can be established by means of routine examinations. Drying can, for example, be carried out in a vacuum drying oven.

If the preparation of the $LiMPO_4$ is carried out in the presence of a carbon-containing electron-conducting substance or a precursor thereof, an intermediate drying temperature above 500 or 700° C. under inert or reducing conditions is generally chosen.

In particular, a calcination can be carried out at, for example, 750° C. under nitrogen 5.0 for, for example, 3 hours. Only when the temperatures are sufficiently high is the desired conductive coating of the carbon-containing or electron-conducting substance obtained. The conditions are advantageously selected so that firstly no oxidation of M(II) to M(III), in particular of Fe(II) to Fe(III), occurs and secondly no reduction of the M(II), for example to phosphides, takes place. The calcination can be carried out in apparatus known to those skilled in the art.

LiFePO$_4$ particles which are too large lead, at high charging/discharge rates (high charging/discharge currents), to a kinetically controlled limitation of the capacity which can be taken from an accumulator, i.e. the lithium ions can no longer migrate quickly enough through the LiMPO$_4$/MPO$_4$ interface during discharge and the specific capacity of the electrode drops greatly at high charging/discharge rates. However, a sufficient specific capacity even at high charging/discharge currents is important for commercial use of the lithium iron phosphate.

The particle size distribution of the LiMPO$_4$ obtained by the process of the invention is preferably very narrow, with, in a particularly preferred embodiment, the difference between the D$_{90}$ and the D$_{10}$ being not more than 2 µm, preferably not more than 1.5 µm, in particular not more than 1 µm, particularly preferably not more than 0.5 µm.

In a preferred embodiment of the invention, the reaction is carried out in the presence of further components, in particular an electron-conducting substance. A carbon-containing solid such as carbon, in particular conductive carbon, or carbon fibres is preferably used for this purpose. It is also possible to use a precursor of an electron-conducting substance or of the carbon-containing solid which is converted during drying or calcination of the LiMPO$_4$ into carbon particles, for example a carbohydrate. The carbon particles present in the finished LiMPO$_4$ product are preferably distributed homogeneously.

Any process with which those skilled in the art are familiar for introducing carbon or a carbon-containing, electrically conductive material or mixing with further components is in principle suitable. Intensive mixing or milling of the finished LiMPO$_4$ with at least one carbon-containing solid such as conductive carbon is also possible. Further possible processes are application of carbon particles to the surface of the LiMPO$_4$ particles in an aqueous or nonaqueous suspension or pyrolysis of a mixture of LiMPO$_4$ powder or LiMPO$_4$ precursor such as the precipitation product obtained in step (b) with a carbon precursor material. The resulting carbon-containing LiMPO$_4$ generally contains up to 10% by weight, preferably up to 5% by weight, particularly preferably up to 2.5% by weight, of carbon.

In industry, preference is given to a pyrolysis process in which, in step (c), at least one carbon precursor material, preferably a carbohydrate such as sugar or cellulose, particularly preferably lactose, is mixed, e.g. by kneading, with the precipitation product which has been separated off after the precipitation or with the LiMPO$_4$ powder which has been separated off after the hydrothermal treatment, with water being able to be added as auxiliary. Particular preference is given in industry to carrying out this mixing after washing but before drying of the moist precipitation product or LiMPO$_4$ powder. The mixture is subsequently dried under protective gas, in air or under reduced pressure at temperatures of preferably from 50° C. to 500° C. and heated under protective gas, e.g. nitrogen 5.0 or argon, to a temperature of from 500° C. to 1000° C., preferably from 700° C. to 800° C., resulting in the carbon precursor material being pyrolysed to carbon. This is preferably followed by a deagglomeration treatment, for example in a rotary screen mill.

The carbon content also improves the ability to process the LiMPO$_4$ powder obtained by the process of the invention to produce battery electrodes by altering the surface properties and/or improves the electrical contact in the battery electrode.

The process of the invention is illustrated below with the aid of nonlimiting examples and with the aid of idealized reaction equations and with reference to the accompanying figures. In the figures:

FIG. 1 schematically shows a process of the type known from DE 103 53 266;

FIG. 2 schematically shows the process of the invention;

Figure 1:
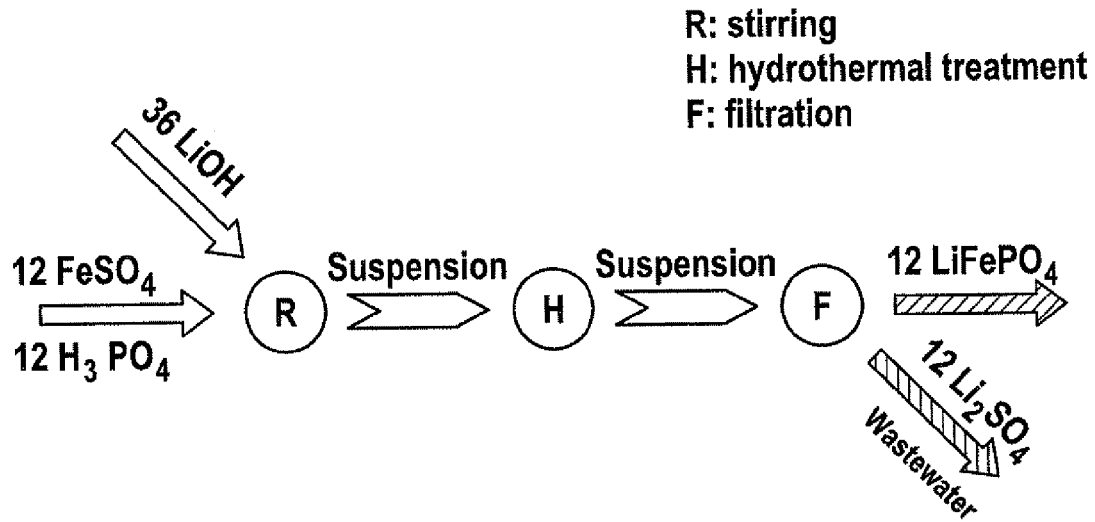

FIG. 1 depicts a process of the type known from DE 103 53 266. In a first step, 36 equivalents of lithium hydroxide and 12 equivalents of iron sulphate and 12 equivalents of phosphoric acid in the form of their aqueous solutions are reacted in the presence of a strong dispersing and milling action (R). Here, the iron sulphate reacts with the phosphoric acid according to the following reaction equation to give iron(II) phosphate octahydrate (=synthetic vivianite).

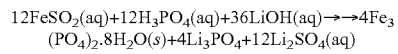
$$12FeSO_2(aq)+12H_3PO_4(aq)+36LiOH(aq)\rightarrow\rightarrow 4Fe_3(PO_4)_2\cdot 8H_2O(s)+4Li_3PO_4+12Li_2SO_4(aq)$$

The precursor mixture obtained is then converted under hydrothermal conditions into the desired phase-pure lithium iron phosphate (H). The reaction occurs according to the following equation:

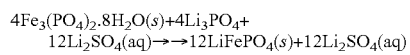
$$4Fe_3(PO_4)_2\cdot 8H_2O(s)+4Li_3PO_4+12Li_2SO_4(aq)\rightarrow\rightarrow 12LiFePO_4(s)+12Li_2SO_4(aq)$$

The LiFePO$_4$ formed can be separated off by filtration (F) and represents the desired end product. 12 Li$_2$SO$_4$ remain in the wastewater and either have to be worked up or be passed to some other disposal. In the reaction depicted in FIG. 1, 36 equivalents of lithium are used, of which one third (12 equivalents) are converted into the desired end product LiFePO$_4$ and 24 equivalents have to be disposed of as waste in the form of Li$_2$SO$_4$.

Figure 2:
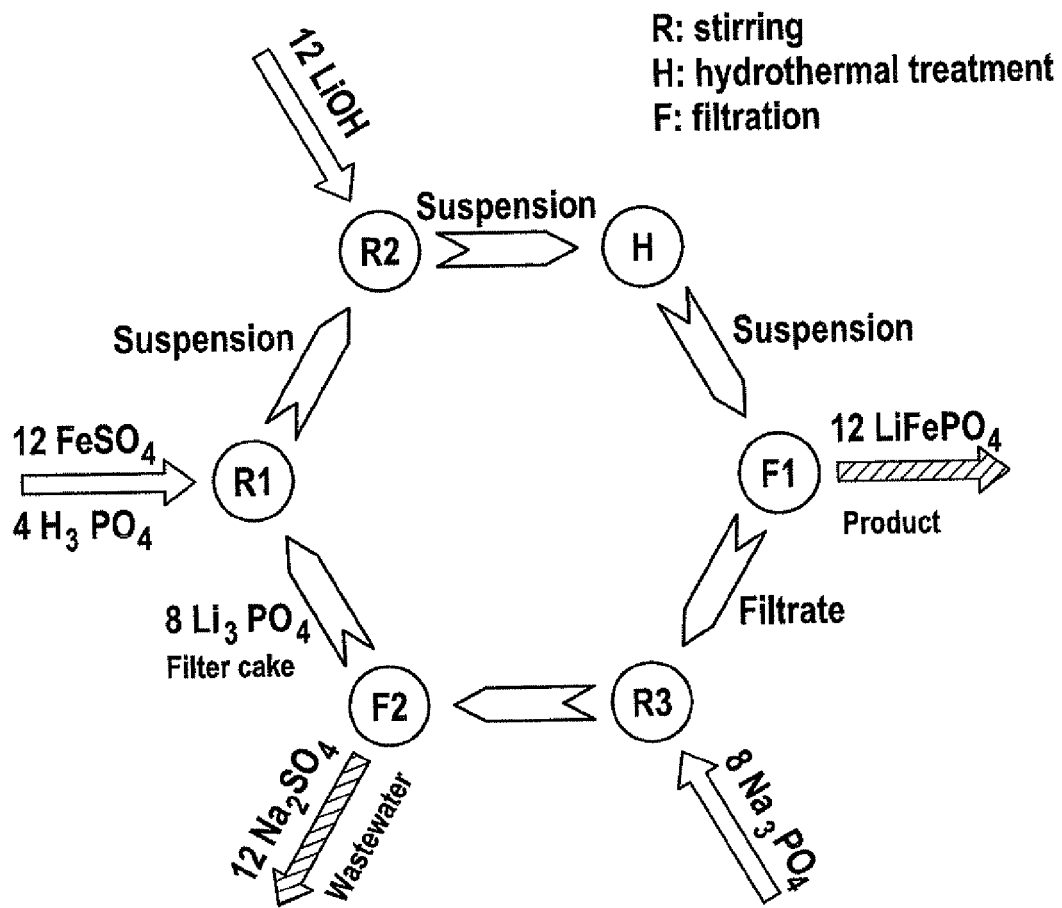

FIG. 2 schematically shows the process of the invention. In a first step, solid lithium orthophosphate is reacted with iron sulphate and phosphoric acid to form vivianite, lithium dihydrogenphosphate, iron sulphate and lithium sulphate according to the following equation (R1):

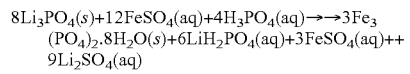
$$8Li_3PO_4(s)+12FeSO_4(aq)+4H_3PO_4(aq)\rightarrow\rightarrow 3Fe_3(PO_4)_2\cdot 8H_2O(s)+6LiH_2PO_4(aq)+3FeSO_4(aq)++9Li_2SO_4(aq) \quad\quad R1$$

In step R2, lithium hydroxide is then added to this suspension, resulting in the iron sulphate remaining in the solution being precipitated as vivianite and the lithium being converted into the corresponding phosphate. The reaction occurs according to the following reaction equation:

$$3Fe_3(PO_4)_2 \cdot 8H_2O(s) + 6LiH_2PO_4(aq) + 3FeSO_4(aq) + 9Li_2SO_4(aq) + 12LiOH(aq) \rightarrow \rightarrow 4Fe_3(PO_4)_2 \cdot 8H_2O(s) + 4Li_3PO_4(s,aq) + 12Li_2SO_4(aq) \quad R2$$

The mixture obtained in step R2 corresponds to a composition as is obtained in reaction R1 in the process of FIG. 1.

In a manner analogous to step H in FIG. 1, a hydrothermal reaction is then carried out to give the lithium iron phosphate as a solid in very phase-pure form (H).

$$4Fe_3(PO_4)_2 \cdot 8H_2O(s) + 4Li_3PO_4 + 12Li_2SO_4(aq) \rightarrow \rightarrow 12LiFePO_4(s) + 12Li_2SO_4(aq) \quad H$$

The reaction gives 12 equivalents of the desired lithium iron phosphate.

After the lithium iron phosphate has been separated off by filtration (F1), a filtrate in which 12 equivalents of $Li_2SO_4$ are dissolved is obtained.

The lithium ions are precipitated in the form of lithium orthophosphate by addition of sodium phosphate (R3).

$$12Li_2SO_4(aq) + 3Na_3PO_4(aq) \rightarrow \rightarrow 8Li_3PO_4(s) + 12Na_2SO_4(aq) \quad R3$$

The precipitate can be separated off (F2) and the lithium orthophosphate can be recirculated to step R1. 12 equivalents of $Na_2SO_4$ are still present in the filtrate and these have to be disposed of in the wastewater.

Overall, 12 equivalents of lithium hydroxide, 12 equivalents of iron sulphate, 4 equivalents of phosphoric acid and 8 equivalents of sodium orthophosphate are introduced in the cyclic process depicted in FIG. 2 and these are converted into 12 equivalents of $LiFePO_4$ and 12 equivalents of $Na_2SO_4$. Compared to the process of FIG. 1, the $Li_2SO_4$ present in the wastewater is thus replaced by $Na_2SO_4$.

Determination of the Particle Size Distribution

The particle size distributions of the precursor suspensions and the $LiMPO_4$ produced are determined by means of light scattering using commercial instruments. This method is known to those skilled in the art, and reference may be made to the disclosure in JP 2002-151082 and WO 02/083555, which are hereby incorporated by reference. In the examples, the particle size distribution was determined by means of a laser light scattering instrument (Mastersizer S, from Malvern Instruments GmbH, Herrenberg, Del.) and the software from the manufacturer (Version 2.19) using a Malvern Small Volume Sample Dispersion Unit, DIF 2002, as measuring unit. The following measurement conditions were selected: compressed range; active beam length 2.4 mm; measurement range: 300 RF; from 0.05 to 900 μm. Sample preparation and measurement were carried out according to the manufacturer's instructions.

The $D_{10}$, $D_{50}$ and $D_{90}$ values are based on the proportion by volume of the respective particles as a fraction of the total volume. The $D_{10}$, $D_{50}$ and $D_{90}$ values are thus the values at which 10% by volume, 50% by volume and 90% by volume, respectively, of the particles in the measured sample have a smaller or equal particle diameter.

EXAMPLE 1

Precipitation of $Li_3PO_4$ by Means of $Na_3PO_4$

A wastewater obtained from the preparation of $LiFePO_4$ by the method shown in FIG. 1 and having a lithium content of 8.5 g/l based on the cation was admixed with the stoichiometric amount and also with a 10% excess of a saturated $Na_3PO_4$ solution (25 g of $Na_3PO_4 \cdot 8H_2O$ in 100 ml of deionized water) as precipitant in order to precipitate $Li_3PO_4$. The amount of wastewater was in each case 50 ml and the solutions were quickly shaken together and then stirred by means of a magnetic stirrer for 1 hour. After filtration with suction and washing on a paper filter, the filter cakes were dried at 60° C. The filtrates were subsequently divided into three equal parts and different increased pH values were set by means of 50% strength sodium hydroxide solution in order to test them for after-precipitation when the pH was increased. Table 1 shows the analytical values for these solutions after suction filtration on a membrane filter and also the dry weights of the filter cakes. According to these results, up to 90% of the lithium was recovered from the wastewater as lithium orthophosphate. In these experiments, an increase in the pH did not lead to an appreciable increase in the yield.

TABLE 1

Analytical values after precipitation by means of $Na_3PO_4$ and filtration

| $Na_3PO_4 \cdot 12H_2O$ solution | NaOH | pH | Li content | Phosphate content | Yield of $Li_3PO_4$ | After precipitation |
|---|---|---|---|---|---|---|
| 7.76 g in 31.0 ml of DI (stoichiometric) | 0 drop | 12 | 0.52 g/l | 4.1 g/l | 2.43 g | |
| | 4 drops | 13 | 0.53 g/l | 4.2 g/l | — | not weighable |
| | 10 drops | 14 | 0.53 g/l | 4.2 g/l | — | not weighable |
| 8.53 g in 34.1 ml of DI (10% excess) | 0 drop | 12 | 0.55 g/l | 6.7 g/l | 2.30 g | |
| | 4 drops | 13 | 0.57 g/l | 7.0 g/l | — | not weighable |
| | 10 drops | 14 | 0.58 g/l | 7.1 g/l | — | not weighable |

DI: deionized water $Li_3PO_4$ was likewise precipitated from 100 ml of a further wastewater having a lithium content of 5.6 g/l by stoichiometric addition of $Na_3PO_4$. The corresponding results are shown in Table 2.

TABLE 2

Analytical values after precipitation by means of $Na_3PO_4$ and filtration

| $Na_3PO_4 \cdot 12H_2O$ solution | NaOH | pH | Li content | Phosphate | Filter cake | After precipitation |
|---|---|---|---|---|---|---|
| 10.2 g in 40.9 ml of DI (stoichiometric) | 0 drop | 12 | 0.57 g/l | 1.5 g/l | 3.26 g | |
| | 5 drops | 13 | 0.58 g/l | 1.5 g/l | — | not weighable |
| | 15 drops | 14 | 0.57 g/l | 1.5 g/l | — | not weighable |

Figure 3:
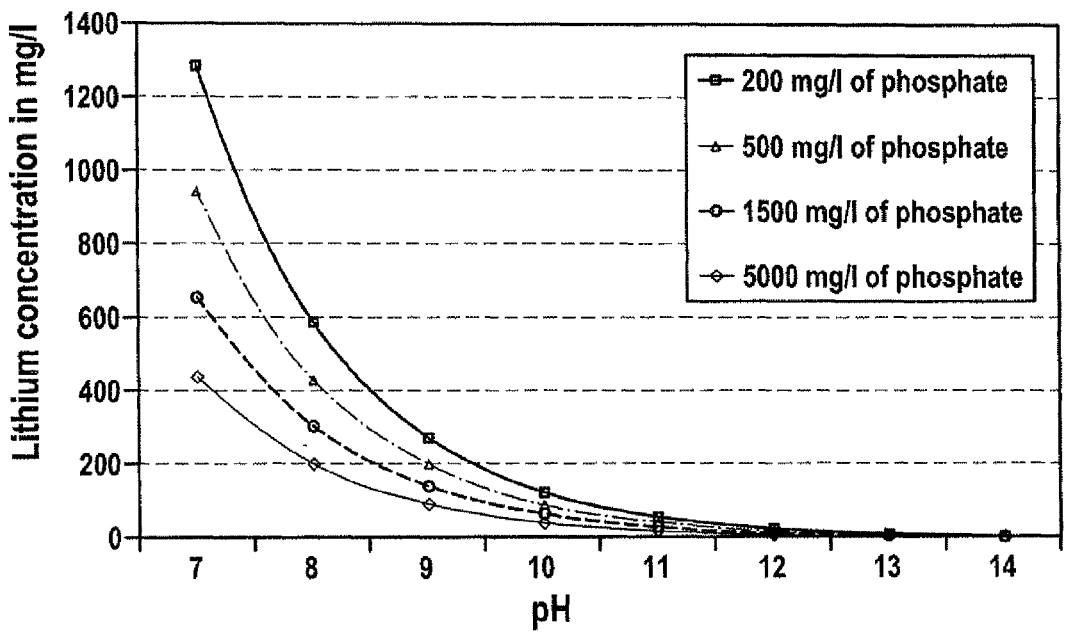
FIG. 3 shows a graph of the theoretically calculated residual lithium concentration in the wastewater as a function of the pH and the residual phosphate concentration.
Figure 4:
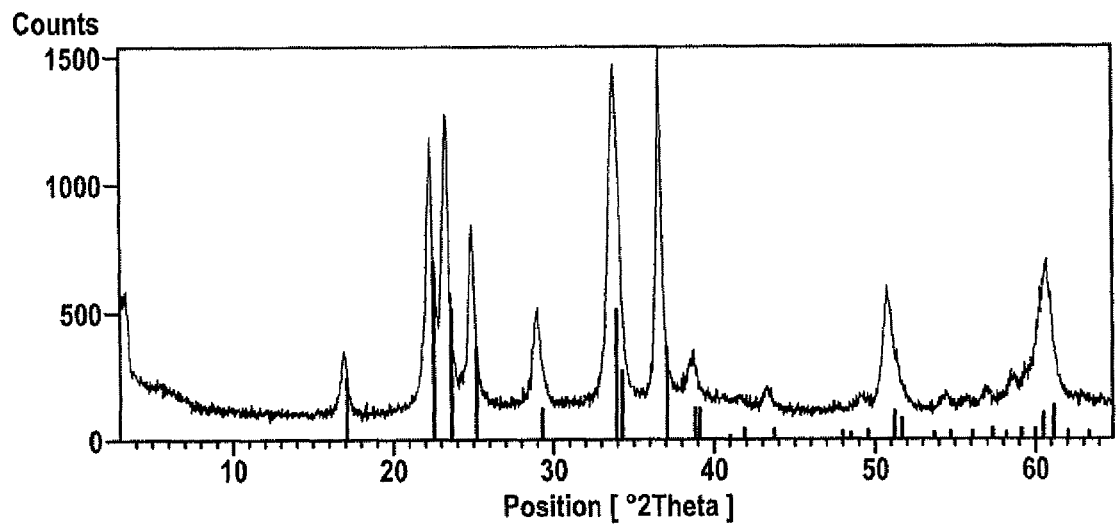
FIG. 4 shows an X-ray diffraction spectrum of a precipitated Li$_3$PO$_4$ from Example 1.
Figure 5:
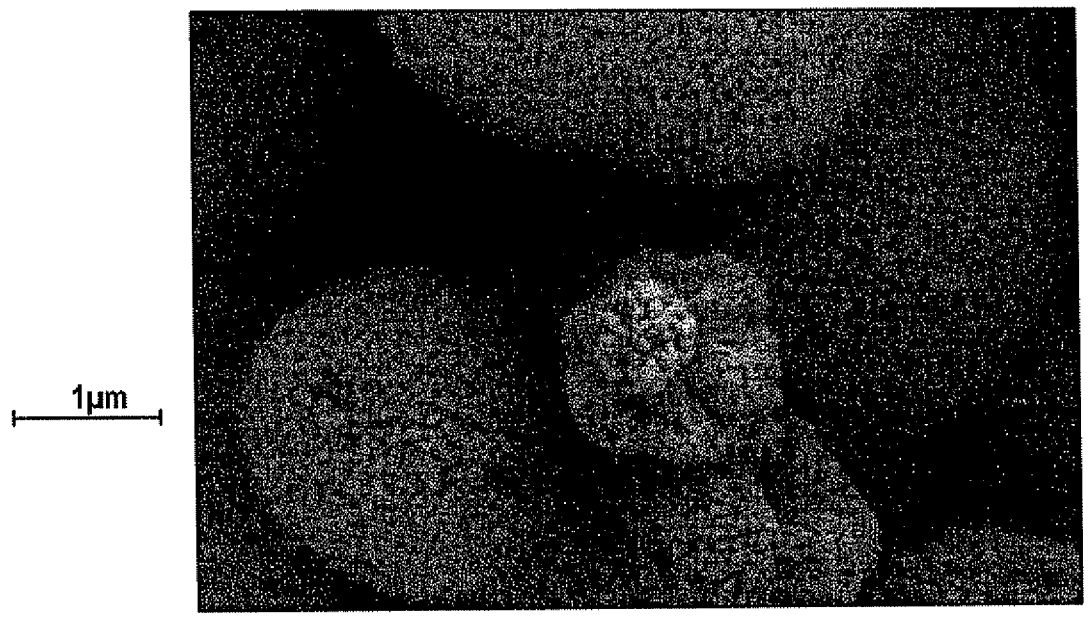
FIG. 5 shows a scanning electron micrograph of a precipitated Li$_3$PO$_4$ from Example 1.
Figure 6:
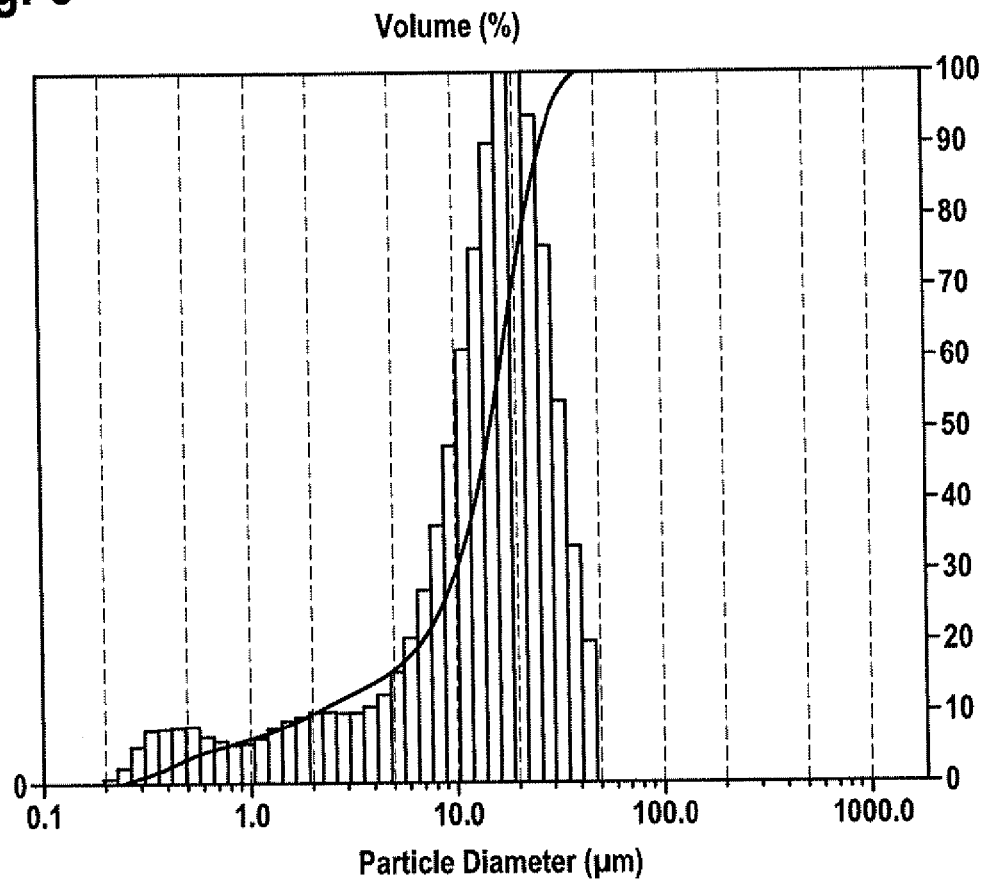
FIG. 6 shows a particle size distribution of a precipitated Li$_3$PO$_4$ from Example 1 determined by laser granulometry.

The residual contents of lithium and phosphate observed in the practical experiment are higher than the theoretically calculated equilibrium values derived from the solubility products and protolysis constants of the species participating in the precipitation equilibrium. The calculated values for the lithium concentration remaining in the wastewater as a function of pH are shown for various phosphate concentrations in FIG. 3. According to the X-ray diffraction spectrum (XRD) depicted in FIG. 4, the precipitation product consists of phase-pure $Li_3PO_4$. The sodium and sulphate contents after washing range from 0.8 to 1.4% by weight or from 1.1 to 1.5% by weight. FIG. 5 shows a scanning electron micrograph of the precipitated $Li_3PO_4$ powder. It comprises small rod-like primary crystals which are assembled in a radiating fashion to form spherical secondary particles in the μm range. The spherical secondary particles in turn form irregularly shaped agglomerates having a $D_{50}$ of 16 μm, as the particle size distribution determined by laser granulometry which is depicted in FIG. 6 shows.

EXAMPLE 2

Reaction of $Li_3PO_4$ with Iron Sulphate and Phosphoric Acid and Reducing Agent to Form Vivianite 3 g of the lithium orthophosphate powder obtained in Example 1 were in each case slurried in a solution comprising 10.8 g of iron(II) sulphate heptahydrate, 1.49 g of 85% strength phosphoric acid and 38.9 g of water and stirred in the glass beaker for one hour. The glass beakers were covered with a film in order to reduce access of air. In addition, 0, 1 or 5 mol % of sulphurous acid (based on Fe) in the form of a 5% strength solution were added as reducing agent to the acidic solution. The pale sky blue suspension which formed immediately was filtered off with suction on a membrane and the washed filter cake was dried at 70° C. for two hours. The sky blue powder obtained in this way consists, according to XRD, of virtually phase-pure synthetic vivianite. Table 3 summarizes the analytical values for the filtrates.

TABLE 3

Analytical values for the filtrates after reaction of $Li_3PO_4$ with Fe(II) sulphate and phosphoric acid and filtration

| $H_2SO_3$ added | pH | Li content | Phosphate | Fe content | Filter cake |
|---|---|---|---|---|---|
| 0 | 3 | 0.93% | 2.8% | 1.5% | 5.123 g |
| 1 mol % (Fe) | 4 | 0.88% | 2.7% | 1.4% | 5.261 g |
| 5 mol % (Fe) | 5 | 0.84% | 2.7% | 1.5% | 5.340 g |

EXAMPLE 3

Figure 7:
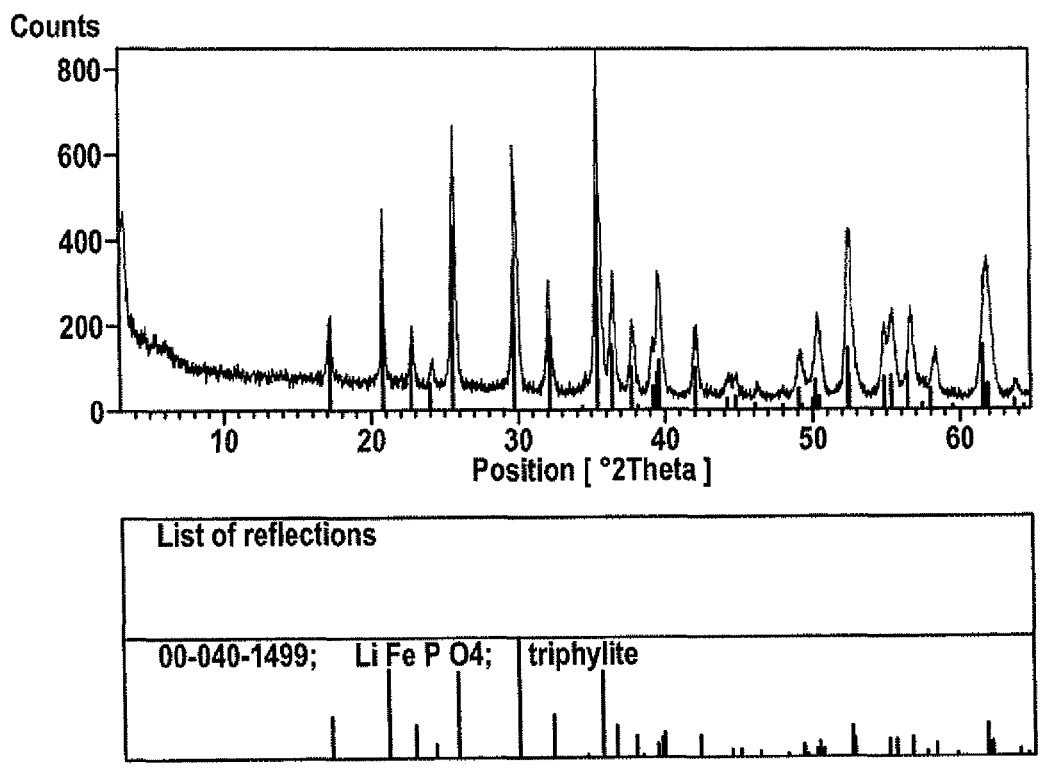
FIG. 7 shows an X-ray diffraction spectrum of the hydrothermally obtained lithium iron phosphate from Example 3.
Figure 8:
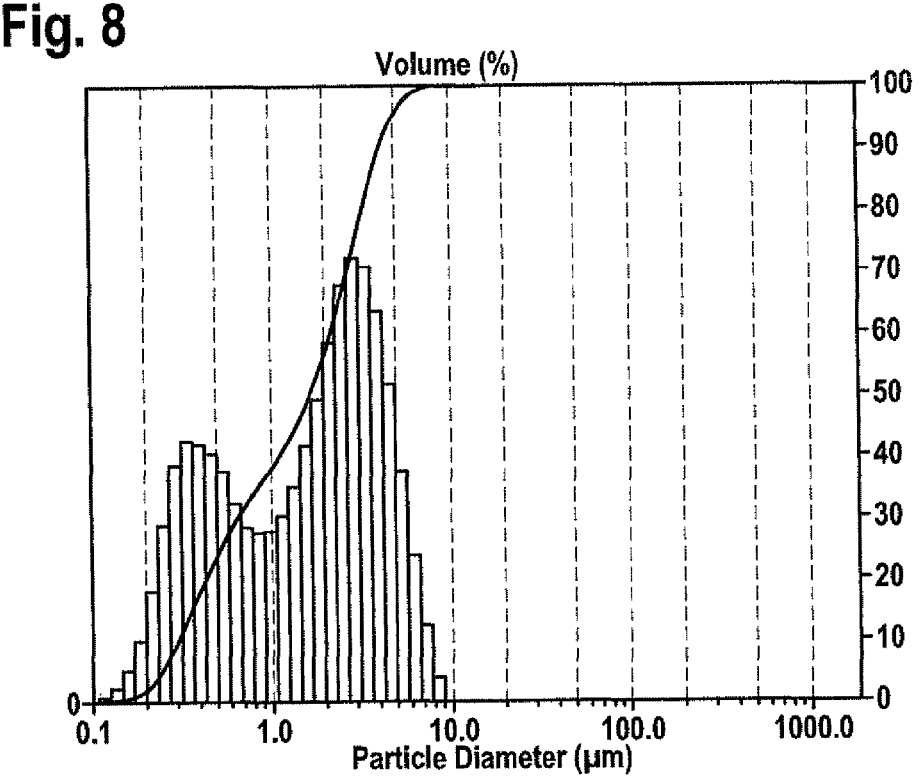
FIG. 8 shows a particle size distribution of the hydrothermally obtained lithium iron phosphate from Example 3 determined by laser granulometry.
Figure 9:
FIG. 9 shows a scanning electron micrograph of the hydrothermally obtained lithium iron phosphate from Example 3.

Preparation of Lithium Iron Phosphate by the Circulatory Process 120 g of lithium orthophosphate are slurried in 0.8 l of deionized water in a Parr stirring autoclave provided with an inclined-blade stirrer, having a nominal volume of 3.8 l and provided with a Parr 4842 regulating unit and nitrogen 5.0 is introduced. 432.17 g of iron(II) sulphate heptahydrate and 59.74 g of 85% strength phosphoric acid dissolved in 2 l of water are then slowly pumped in. The suspension is stirred by means of the inclined-blade stirrer for 1 hour and during this time is circulated by pumping by means of a disperser (IKA-Laborpilot UTL2000/4 with middle generator). While continuing the dispersing procedure, 66.48 g of lithium hydroxide monohydrate (dissolved in 0.8 l of water) are then added. After this addition, the stirring autoclave is then separated from the disperser and closed so as to be pressure-tight. The suspension still present in the disperser is filtered off with suction on a filter membrane and washed and used as sample of the precipitation product. For the hydrothermal treatment of the contents of the autoclave, the stirring autoclave is heated to 160° C. over a period of 1.5 hours and maintained at this temperature for 10 hours while continuing to stir. After cooling, the greyish white suspension is filtered through paper in a pressure filter and washed until the conductance is 200 μS/cm. The filter cake, which slowly flows apart, is dried overnight at 70° C. in a vacuum oven and deagglomerated in a laboratory rotor mill ("Fritsch Pulverisette 14") fitted with a 0.08 mm screen. According to XRD, the greyish white powder obtained in this way is phase-pure triphyline (FIG. 7). Laser granulometry (Malvern Mastersizer S Version 2.19) indicates a slightly bimodal particle size distribution having a volume-based $D_{10}$ of 0.3 μm, a $D_{50}$ of 1.8 μm and a $D_{90}$ of 4.5 μm (FIG. 8). The specific surface area determined by the BET method is about 15 $m^2/g$. A scanning electron micrograph of the lithium iron phosphate powder obtained is shown in FIG. 9.

Figure 10:
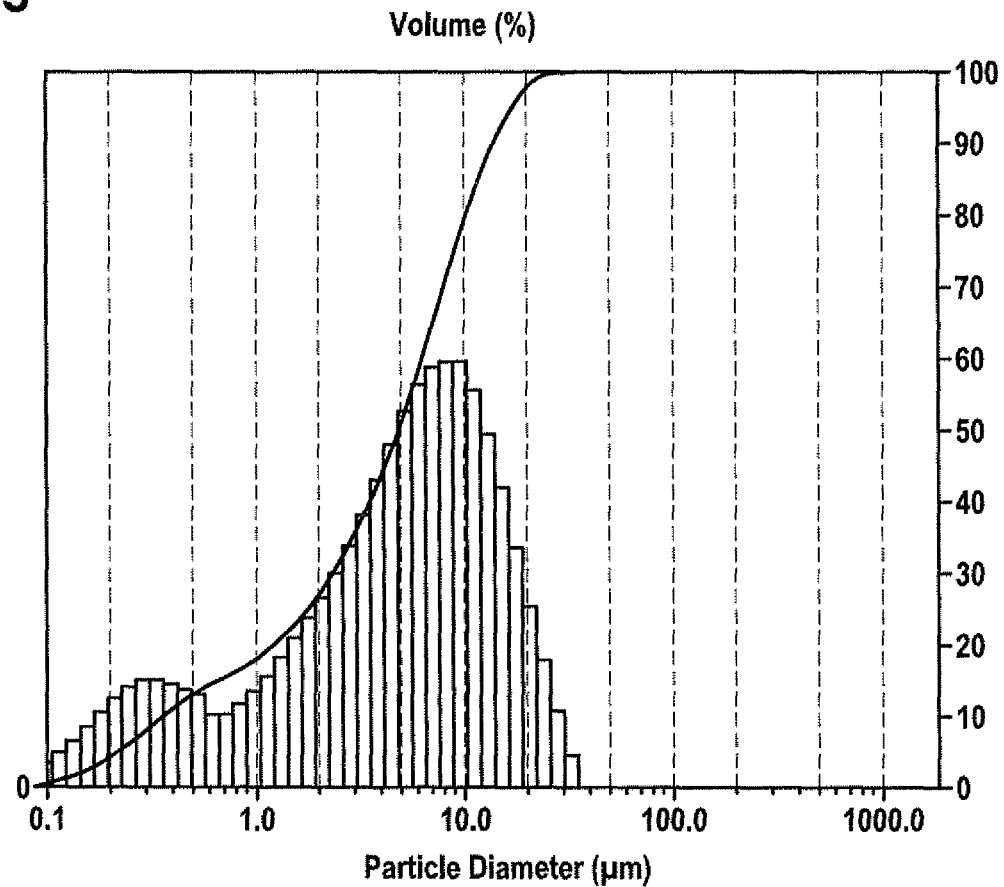
FIG. 10 shows a particle size distribution of the precipitation product prior to the hydrothermal treatment from Example 3 determined by laser granulometry.

According to X-ray diffraction, the greenish precipitation product taken from the disperser consists of a mixture of vivianite and lithium orthophosphate. The particle size distribution shown in FIG. 10 has a volume-based $D_{10}$ of 0.4 μm, a $D_{50}$ of 5.2 μm and a $D_{90}$ of 15.9 μm.

The analytical values for the associated filtrate which has been separated off are 1 mg/l of Fe, 28 mg/l of phosphate and 7.1 g/l of Li. The correspondingly very low phosphate/lithium molar ratio of 3:10 000 shows that the lithium phosphate is predominantly present as solid and not as solution after the precipitation reaction. The solid can therefore be converted by calcination in a reducing or inert atmosphere, in the presence or absence of a carbon-containing precursor substance, into largely phase-pure lithium iron phosphate.

The invention claimed is:

1. A process for preparing a lithium metal phosphate of the formula $LiMPO_4$, where M is at least one divalent metal, which comprises:
   a) reacting a $Li_3PO_4$ (lithium phosphate) with at least one metal salt $MX_n$ and an acid phosphate source in a solution containing the at least one metal salt $MX_n$ and the acid metal phosphate source and a polar solvent, wherein M is at least one transition metal and X is an anion other than phosphate which together with the metal M forms a salt which is soluble in the solvent and n is the quotient of the valency of the metal M and the valency of the anion X, giving a suspension of particles of at least one M-containing phosphate in the solvent;
   b) adding a basic lithium source to the suspension of M-containing phosphate in the solvent obtained in (a), giving a precipitation product;
   c) converting the precipitation product obtained in (b) into a lithium metal phosphate of the formula $LiMPO_4$, giving a residual solution containing lithium ions;
   d) adding a basic phosphate source to the residual solution so that lithium phosphate is precipitated from the residual solution; and
   e) separating the lithium phosphate from the residual solution.

2. A process according to claim 1, wherein the lithium phosphate obtained in (e) is recirculated to (a).

3. A process according to claim 1, wherein M is selected from the group consisting of Fe, Mn, Co and Ni.

4. A process according to claim 1, wherein M is Fe.

5. A process according to claim 1, wherein X is selected from the group consisting of chloride, nitrate and sulphate.

6. A process according to claim 1, wherein the pH of the solution containing the at least one metal salt $MX_n$, the acid phosphate source and the polar solvent is less than 2, the pH of the suspension of M-containing phosphate in the solvent is in the range of 2 to 6, and the pH of the suspension containing the precipitated product in (b) is in the range from 6 to 8.

7. A process according to claim 1, wherein a reducing agent is added in (a) or (b) or in (a) and (b).

8. A process according to claim 1, wherein the polar solvent is water.

9. A process according to claim 1, wherein the acid phosphate source in (a) is a phosphoric acid compound.

10. A process according to claim 1, wherein the basic lithium source in (b) is lithium hydroxide or lithium oxide or is lithium hydroxide and lithium oxide.

11. A process according to claim 1, wherein the basic phosphate source in (d) is an alkali metal phosphate.

12. A process according to claim 1, wherein the reacting in (a) and adding in (b) are carried out at a temperature of 5° to 80° C.

13. A process according to claim 1, wherein (a) or (b), or (a) and (b) comprises forming particle aggregates and (a) or (b), or (a) and (b), further comprises carrying out deagglomerating or comminuting, or deagglomerating and comminuting, particle aggregates in the suspension until the $D_{90}$ of the particles present in the suspension is less than 50 μm.

14. A process according to claim 13, wherein the $D_{90}$ of the particles present in the suspension is less than 25 μm.

15. A process according to claim 13, wherein the dispersing or milling treatment is carried out in (a) or (b) or in (a) and (b).

16. A process according to claim 13, wherein
   (I) the deagglomerating or comminuting, or deagglomerating and comminuting, particle aggregates commences before addition of the metal salt $MX_n$ in (a) and is continued during (a) or
   (II) the deagglomerating or comminuting, or deagglomerating and comminuting, particle aggregates commences before addition of the metal salt $MX_n$ in (a) and is continued during (a) and (b) or
   (III) the deagglomerating or comminuting, or deagglomerating and comminuting, particle aggregates in (b) commences before addition of the basic lithium source and is continued during (b).

17. A process according to claim 1, further comprising adding
   (A) a carbon-containing or electron-conducting substance or a precursor compound of an electron-conducting substance, or
   (B) a carbon-containing and electron-conducting substance, or
   (C) an electron-conducting substance and a precursor compound of an electron-conducting substance, or
   (D) a carbon-containing and a precursor compound of an electron-conducting substance, or
   (E) a carbon-containing and electron-conducting substance and a precursor compound of an electron-conducting substance, in
   (I) (a) or (b) or (c), or
   (II) (a) and (b), or
   (III) (b) and (c), or
   (IV) (a) and (c), or
   (V) (a) and (b) and (c).

18. A process according to claim 17, wherein the electron-conducting substance is carbon.

19. A process according to claim 17, wherein the precursor compound of an electron-conducting substance is a carbon-containing compound.

20. A process according to claim 9, wherein the phosphoric acid compound is $H_3PO_4$ and the ratio of $Li_3PO_4:MX_n:H_3PO_4$ is about 8:12:4.

21. A process according to claim 1, wherein
   (I) (a) or (b) or (c), or
   (II) (a) and (b), or
   (III) (b) and (c), or
   (IV) (a) and (c), or
   (V) (a) and (b) and (c),
are carried out under an inert gas atmosphere.

22. A process according to claim 13, wherein the deagglomerating or comminuting, or deagglomerating and comminuting, particle aggregates of the suspension is carried out by a disperser, a mill, an intensive mixer, a centrifugal pump, an in-line mixer, a mixing nozzle or an ultrasonic instrument.

23. A process according to claim 1, wherein the precipitation product from (b) is, in (c), separated off, optionally washed and dried, and then converted by calcination under an inert or reducing condition into lithium metal phosphate.

24. A process according to claim 1, wherein the precipitation product from (b) is converted directly into lithium metal phosphate under a hydrothermal condition in (c).

25. A process according to claim 24, wherein the precipitation product from (b) is converted directly into lithium metal phosphate under a hydrothermal condition in (c) which is carried out at a temperature of 100 to 250° C. and a pressure of 1 bar to 40 bar of steam pressure.

26. A process according to claim 1, wherein the precipitation product in (b) which has been separated off and optionally washed or lithium metal phosphate in (c), optionally before a drying, is mixed with a carbon-containing precursor compound and dried at a temperature of 50° to 500° C. and calcined at a temperature of 500° to 1000° C. under an inert or reducing condition.

27. A process for preparing a lithium metal phosphate of the formula $LiMPO_4$, where M is at least one divalent metal, which comprises:
   f) reacting at a temperature of 5 to 80° C. a $Li_3PO_4$ (lithium phosphate) with at least one metal salt $MX_n$ and an acid phosphate source in a solution containing the at least one metal salt $MX_n$ and the acid metal phosphate source and a polar solvent, wherein M is at least one transition metal and X is an anion other than phosphate which together with the metal M forms a salt which is soluble in the solvent and n is the quotient of the valency of the metal M and the valency of the anion X, giving a suspension of particles of at least one M-containing phosphate in the solvent;
   g) adding a basic lithium source to the suspension of M-containing phosphate in the solvent obtained in (a), giving a precipitation product;
   h) converting the precipitation product obtained in (b) into a lithium metal phosphate of the formula $LiMPO_4$, giving a residual solution containing lithium ions;
   i) adding a basic phosphate source to the residual solution so that lithium phosphate is precipitated from the residual solution; and
   j) separating the lithium phosphate from the residual solution.

* * * * *